United States Patent
Munday et al.

(10) Patent No.: US 10,075,167 B2
(45) Date of Patent: Sep. 11, 2018

(54) PROGRAMMABLE LOGIC DEVICE VIRTUALIZATION

(71) Applicant: Altera Corporation, San Jose, CA (US)

(72) Inventors: David Alexander Munday, Santa Cruz, CA (US); Randall Carl Bilbrey, Jr., San Jose, CA (US); Evan Custodio, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 15/818,451

(22) Filed: Nov. 20, 2017

(65) Prior Publication Data

US 2018/0076814 A1      Mar. 15, 2018

Related U.S. Application Data

(63) Continuation of application No. 15/336,640, filed on Oct. 27, 2016, now Pat. No. 9,825,635, which is a
(Continued)

(51) Int. Cl.
*H03K 19/177*        (2006.01)
*G06F 21/76*         (2013.01)
(Continued)

(52) U.S. Cl.
CPC ....... *H03K 19/17756* (2013.01); *G06F 8/656* (2018.02); *G06F 8/67* (2013.01); *G06F 9/44505* (2013.01); *G06F 9/5077* (2013.01); *G06F 17/5027* (2013.01); *G06F 17/5054* (2013.01); *G06F 21/76* (2013.01); *H03K 19/177* (2013.01);
(Continued)

(58) Field of Classification Search
CPC .......... G05B 2219/13007; G05B 2219/25268; G06F 17/5054; G06F 21/76; G06F 2015/768; H03K 19/177; H03K 19/17704; H03K 19/17708; H03K 19/17724; H03K 19/17728; H03K 19/017581; H03K 19/01837; H03K 19/018585;
(Continued)

(56) References Cited

U.S. PATENT DOCUMENTS 7,957,208 B1   6/2011  Tang et al.
8,533,655 B1   9/2013  Konduru
(Continued)

OTHER PUBLICATIONS

Khalaf, Mario, et al., Making Hardware More Like Software, http://www.embedded.com/design/operating-systems/4216418/Making-hardware-more-like-software-, May 27, 2011.
(Continued)

*Primary Examiner* — Vibol Tan
(74) *Attorney, Agent, or Firm* — Fletcher Yoder, P.C.

(57) ABSTRACT

A device includes a programmable logic fabric. The programmable logic fabric includes a first area, wherein a first persona is configured to be programmed in the first area. The programmable logic fabric also includes a second area, wherein a second persona is configured to be programmed in the second area in a second persona programming time. The device is configured to be controlled by a host to switch from running the first persona to running the second persona in a time less than the second persona programming time.

20 Claims, 5 Drawing Sheets

Related U.S. Application Data continuation of application No. 14/875,207, filed on Oct. 5, 2015, now Pat. No. 9,503,094.

(51) Int. Cl.
*G06F 9/445* (2018.01)
*G06F 9/50* (2006.01)
*G06F 17/50* (2006.01)
*H04L 29/06* (2006.01)
*G06F 8/656* (2018.01)

(52) U.S. Cl.
CPC ... H03K 19/1776 (2013.01); H03K 19/17728 (2013.01); H04L 65/403 (2013.01)

(58) Field of Classification Search
CPC ........ H03K 5/1502; H04N 7/14; H04N 7/147; H04N 7/152; H04N 7/15; H04N 19/187; H04L 65/403

See application file for complete search history.

(56) References Cited

U.S. PATENT DOCUMENTS

| | | | |
|---|---|---|---|
| 8,910,109 B1 * | 12/2014 | Orthner | H03K 19/003 110/116 |
| 8,997,033 B1 | 3/2015 | Hew | |
| 9,141,747 B1 * | 9/2015 | Orthner | H03K 19/003 |
| 9,191,617 B1 | 11/2015 | James et al. | |
| 9,584,130 B1 | 2/2017 | Weber et al. | |
| 2016/0352338 A1 | 12/2016 | Xiao | |

OTHER PUBLICATIONS

Design Planning for Partial Reconfiguration, QII51026, Altera Corporation, Nov. 4, 2013.
Ma Yuchun et al: "HW/SW partitioning for region-based dynamic partial reconfigurable FPGAs", 2014 IEEE 32nd International Conference on Computer Design (ICCD), IEEE, Oct. 19, 2014 (Oct. 19, 2014), pp. 470-476.
About Partial Reconfiguration, http://quartushelp.altera.com/13.1/master.htm#mergedProjects/comp/comp/comp_about_part_reconfig.htm, Quartus II Help v13.1, Altera Corporation, Oct. 2, 2015.
Extended EP Search Report for EP Application No. 16192314.9 dated Feb. 7, 2017; 11 Pages.

* cited by examiner

PROGRAMMABLE LOGIC DEVICE VIRTUALIZATION

CROSS-REFERENCE TO RELATED APPLICATION

This application is a continuation of U.S. application Ser. No. 15/336,640, filed Oct. 27, 2016, entitled "Programmable Logic Device Virtualization," which is a continuation of U.S. application Ser. No. 14/875,207, filed Oct. 5, 2015 (now U.S. Pat. No. 9,503,094), entitled "Programmable Logic Device Virtualization," the contents of each of which are incorporated by reference in their entireties.

BACKGROUND

The present disclosure relates generally to virtualization of integrated circuits having programmable logic that can undergo partial reconfiguration.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits are used in numerous electronic devices and for numerous purposes. Some integrated circuits include programmable logic, such as field programmable gate array (FPGA) fabric, that can be programmed to support a variety of circuit designs after manufacturing. These programmable logic devices may contain programmable logic circuitry that can be programmed to perform a variety of functions.

Some programmable logic devices support a form of programming referred to as "partial reconfiguration." Partial reconfiguration involves programming an initial programmable logic design into the programmable logic device that can be rapidly reconfigured during runtime. Thus, while the initial programmable logic design may take a substantial amount of programming time (e.g., on the order of hours), partial reconfiguration during runtime may be faster (e.g., on the order of seconds). The initial programmable logic design may include a number of logic elements that can be rapidly reprogrammed during runtime. This allows the initial programmable logic design to support many different partial reconfiguration implementations, known as "personas," to be rapidly reprogrammed during runtime.

Thus, partial reconfiguration allows a programmable logic device to switch personas faster than the time it would take to fully reprogram the programmable logic device with a new initial programmable logic design. Despite this, even the short time involved in switching personas may present undesirable latency for some use cases. The impact of this latency may be compounded for use cases that involve switching personas relatively often.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems, methods, and devices of this disclosure may avoid some latency associated with partial reconfiguration by virtually running a smaller programmable logic device on a larger programmable logic device. For example, a larger integrated circuit device having a larger amount of programmable logic fabric may be used to emulate a "virtual" smaller integrated circuit device having a smaller amount of programmable logic fabric. From an outside perspective, the virtual smaller integrated circuit device may operate in many respects like an actual smaller integrated circuit device. By taking advantage of the larger programmable area of the larger integrated circuit device, however, the virtual smaller integrated circuit device may appear to perform certain operations, such as partial reconfiguration, faster. For instance, different partitions of the programmable logic fabric of the larger integrated circuit device may be programmed with different respective personas. To switch between running a first persona and running a second persona, the larger integrated circuit device can switch from using the partition of the programmable logic fabric where the first persona has been programmed to using the partition of the programmable logic fabric where the second persona has been programmed. This switch between personas may be faster than the time it would take to perform partial reconfiguration reprogramming of the first persona into the second persona on an actual smaller integrated circuit device.

In effect, this gives the appearance of a virtual smaller integrated circuit device that performs partial reconfiguration faster than otherwise possible on an actual smaller integrated circuit device. That is, even though an actual smaller integrated circuit device might have enough programmable logic fabric to be programmed with just one persona at a time (such that switching between a first persona and a second persona would entail some partial reconfiguration programming latency), the virtual smaller integrated circuit device emulated on the larger integrated circuit device may avoid some of the latency of partial reconfiguration by exploiting the larger amount of programmable logic fabric on the larger integrated circuit device. Indeed, in some examples, even while a first persona is running in one partition of the programmable logic of the larger integrated circuit device, a second persona can be programmed into another partition. Once the second persona has been programmed, switching personas may entail switching from the first partition to the second partition—a transition that may be faster than the time to program the second persona.

In a first embodiment, a device includes a programmable logic fabric. The programmable logic fabric includes a first area, wherein a first persona is configured to be programmed in the first area. The programmable logic fabric also includes a second area, wherein a second persona is configured to be programmed in the second area in a second persona programming time. The device is configured to be controlled by a host to switch from running the first persona to running the second persona in a time less than the second persona programming time.

In a second embodiment, a system includes a programmable logic fabric and a host. The host is configured to initially configure the programmable logic fabric into a plurality of partitions. The host is also configured to partially reconfigure the programmable logic fabric by programming a first persona in a first partition of the plurality of partitions.

The host is further configured to run the first persona. The host is configured to partially reconfigure the programmable logic fabric by programming a second persona in a second partition of the plurality of partitions while running the first persona. The host is also configured to switch from running the first persona to running the second persona, wherein a first programming time of the second persona is at least partially hidden by programming the second persona while miming the first persona.

In a third embodiment, a method includes programming a first persona into a first partition of an integrated circuit. The method also includes running the first persona. The method further includes programming a second persona into a second partition of the integrated circuit in a first programming time while running the first persona. The method includes switching from running the first persona to running the second persona in less time than the first programming time.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

This disclosure relates to enhancing the perceived performance of an integrated circuit device. In particular, a larger integrated circuit device may effectively emulate a smaller integrated circuit device (a "virtual" smaller integrated circuit device) that may perform partial reconfiguration faster, in at least some respects, than would an actual version of the smaller integrated circuit device. In one example, an initial programmable logic design may be programmed into programmable logic of the larger integrated circuit device. The initial programmable logic design may have multiple partitions (which may be separate or may overlap) that can be subsequently programmed through "partial reconfiguration" into particular personas. Thus, even while a first persona is running in a first partition, a second persona can be programmed into a second partition in the larger integrated circuit device. Outwardly, the appearance of the larger integrated circuit device may be that of a virtual smaller integrated circuit with comparatively lower partial reconfiguration latency than an actual smaller integrated circuit. That is, in effect, the latency of programming the subsequent persona may be hidden. Indeed, the time involved in switching from the first persona to the second persona may lower than the time it would take to reprogram the first persona into the second persona, since the second persona may already be programmed in the other partition.

Figure 1:
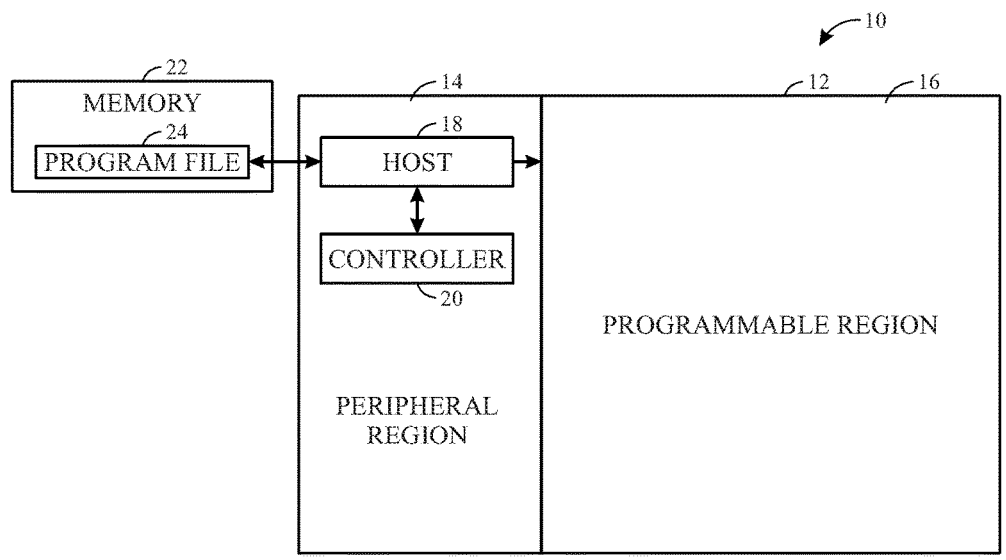
FIG. 1 is a diagram illustrating a system that uses an integrated circuit architecture with an internal host, in accordance with an embodiment.
Figure 2:
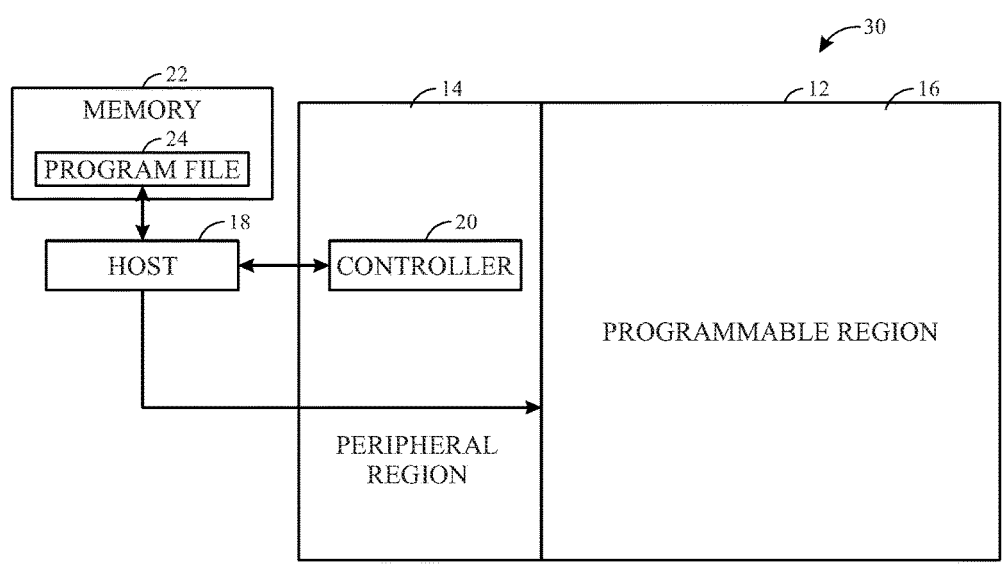
FIG. 2 is a diagram illustrating a system that uses an integrated circuit architecture with an external host, in accordance with an embodiment.

With the foregoing in mind, FIGS. 1 and 2 illustrate examples of a programmable logic device virtualization system 10 that can virtually reduce some latency associated with partial reconfiguration. The system 10 may do so by emulating a virtual integrated circuit device using an actual integrated circuit device 12 that includes a peripheral region 14 and a programmable region 16. The integrated circuit device 12 may thus be understood to represent or include a programmable logic device (PLD). By way of example, the integrated circuit device 12 may represent a field programmable gate array (FPGA) device such as Stratix® 10 or Stratix® V FPGAs by Altera Corporation. Although the peripheral region 14 is schematically shown on one side of the programmable region 16, it should be appreciated that, in at least some actual implementations, the peripheral region 14 may extend all around the programmable region 16. The peripheral region 14 supports the programmable region 16 and, as such, may include input/output (I/O) interfaces (e.g., transmitters and receivers, memory interfaces, and so forth) and clock and data network control circuitry. The programmable region 16 may include any suitable programmable logic fabric (e.g., field programmable gate array (FPGA) fabric).

In the example of FIG. 1, a host 18 is disposed on-chip in the peripheral region 14 of the integrated circuit device 12, while in FIG. 2, the host 18 is external to the integrated circuit device 12. In the examples of both FIG. 1 and FIG. 2, the host 18 may interface with a controller 20 disposed in the peripheral region 14. Based on instructions from the host 18, the controller 20 may initially program the programmable region 16 and/or partially reconfigure the programmable region 16 into certain personas after the programmable region 16 has been initially programmed.

For example, a memory or storage device 22 may store a program file 24 that defines a partially reconfigurable initial programmable logic design and/or various partial reconfiguration personas. The memory device 22 may include, but is not limited to, random access memory (RAM), read only memory (ROM), Flash memory, and the like. The program file 24 may be generated using programmable logic device design software, such as a version of the Quartus® software by Altera Corporation. The initial programmable logic design in the program file 24 may include logic that, when programmed into the programmable region 16, may enable subsequent partial reconfiguration during runtime. That is, the initial programmable logic design may include certain logic elements that can be rapidly reconfigured during runtime through partial reconfiguration to produce specific program implementations known as different "personas." As mentioned briefly above, partial reconfiguration involves programming an initial programmable logic design into the programmable logic device that can be rapidly reconfigured during runtime. Thus, while the initial programmable logic design may take a substantial amount of programming time (e.g., on the order of hours), partial reconfiguration during runtime may be faster (e.g., on the order of seconds). Since the initial programmable logic design may include a number of logic elements that can be rapidly reprogrammed during runtime, the initial programmable logic design may support many different partial reconfiguration personas.

Since even the relatively quick latency of programming partial reconfiguration personas may be undesirable for certain use cases, the integrated circuit device 12 may be used to emulate a smaller "virtual" integrated circuit device to avoid some of these latency effects. By way of example, the integrated circuit device 12 may be an integrated circuit device such as the Stratix® 10 programmable logic device by Altera Corporation, and may be used to emulate one or more virtual versions of the Stratix® V programmable logic device by Altera Corporation. In general, the integrated circuit device 12 may be any suitable integrated circuit device having sufficient programmable logic in the programmable region 16 to support multiple partial reconfiguration personas being programmed in different partitions of the programmable region 16.

Figure 3:
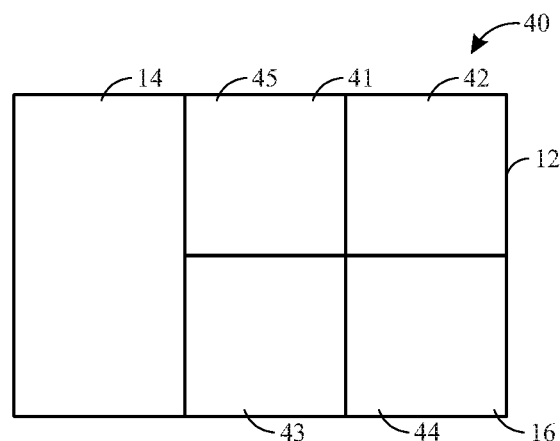
FIG. 3 is a diagram illustrating a system that includes a field programmable gate array (FPGA) that has a partitionable programmable region that has been partitioned in accordance with an embodiment.

To this end, the programmable region 16 may also be divisible into partitions that can respectively be programmed with different personas. FIG. 3 is a diagram that illustrates an integrated circuit device 12 that has a programmable region 16 that is partitioned in a way where the partitions do not overlap. In the particular example of FIG. 3, the programmable region 16 is divided into four partitions 45: a first partition 41, a second partition 42, a third partition 43, and a fourth partition 44. It should be appreciated that this is merely one example, and that the programmable region 16 may be divided into more or fewer partitions. In some cases, all of the partitions may be programmed with the exact same underlying initial programmable logic design (e.g., a logic design that can support subsequent partial reconfiguration into the same partial reconfigurations personas). In other cases, the partitions may be programmed with different underlying initial programmable logic designs (e.g., the program file 24 may designate the partitions 45 based on resources located in each partition 45). In one example, the program file 24 may designate the first partition 41, the second partition 42, the third partition 43, and the fourth partition 44 to be located where they are placed on the integrated circuit device 12 to provide access to certain specific desirable components (e.g., logic array blocks (LABs), embedded memory blocks, digital signal processing (DSP) blocks, etc.).

By selectively using each partition 45, the integrated circuit device 12 may appear outwardly as a "virtual" smaller integrated circuit device with faster partial reconfiguration capabilities. In one particular example, each partition 45 may have approximately equal size and may possess approximately equal resources and capabilities. Under such conditions, each partition 45 may appear to support a different persona of a virtual integrated circuit device that is approximately one quarter the size of the original integrated circuit device 12. In some embodiments, each partition 45 may be different in size and/or possessing different quantities of resources and capabilities. Each partition 45 may also be programmed with one or more personas. For example, the first partition 41 may be programmed with a first persona, the second partition 42 may be programmed with a second persona, the third partition 43 may be programmed with a third persona, and the fourth partition 44 may be programmed with a fourth persona. The first partition 41 may also be programmed with a fifth persona.

Figure 4:
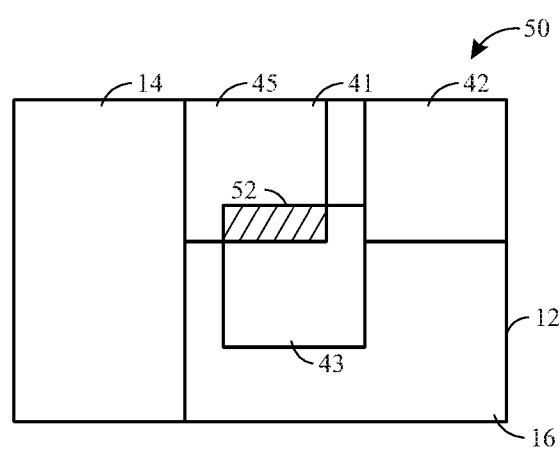
FIG. 4 is a diagram illustrating a system that includes an integrated circuit that has a partitionable programmable region that has overlapping partitions that share resources in accordance with an embodiment.

The partitions 45 may overlap or share resources. FIG. 4 is a diagram that illustrates an integrated circuit device 12 that has a programmable region 16 that has partitions 45 that share resources in accordance with an embodiment. In the specific example of FIG. 4, the programmable region 16 is divided into three partitions, a first partition 41, a second partition 42, and a third partition 43. The first partition 41 and the third partition 43 share resources 52 (e.g., LABs, embedded memory blocks, DSP blocks, etc.). Each partition 45 may be programmable with a persona. For example, the first partition 41 may be programmed with a first persona, the second partition 42 may be programmed with a second persona, and the third partition 43 may be programmed with a third persona. Because the first partition 41 and the third partition 43 share the resources 52, the first partition 41 may not run while the third partition 43 is programmed, and vice versa.

Figure 5:
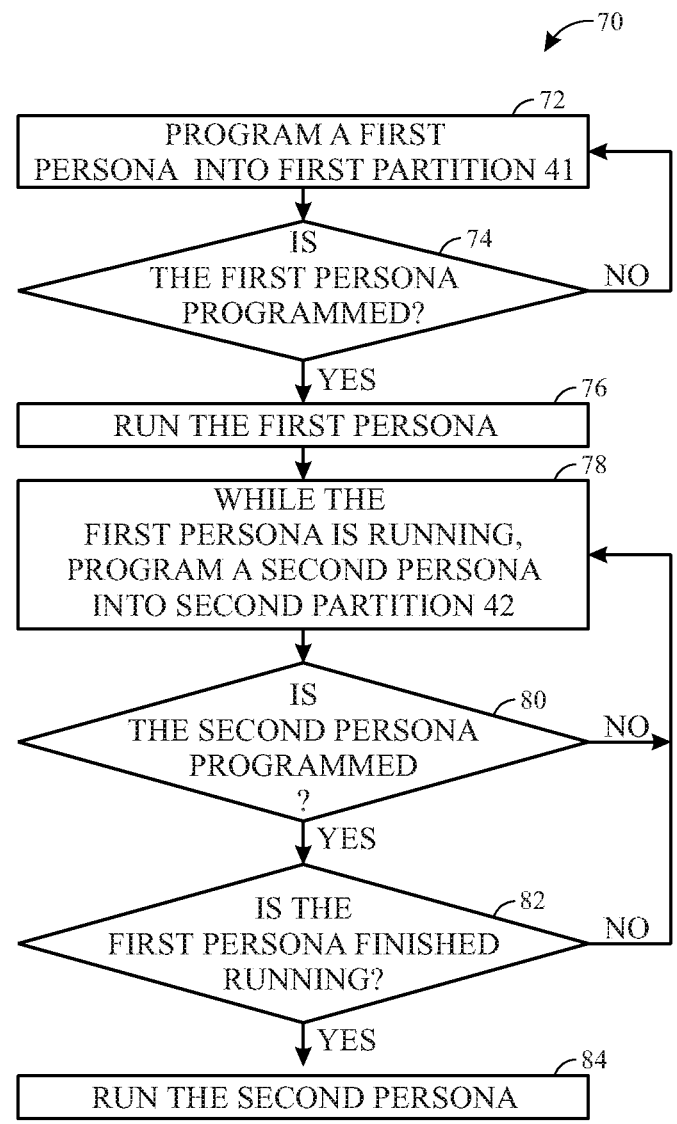
FIG. 5 is a flowchart illustrating a method of programming and running partial reconfiguration personas using a larger integrated circuit device to give the appearance of a virtual smaller integrated circuit device that performs partial reconfiguration faster than an actual smaller integrated circuit device, in accordance with an embodiment.

Turning now to programming and running the personas on the partitions 45 of the integrated circuit device 12, FIG. 5 is a flowchart illustrating a method 70 of programming and running personas in accordance with an embodiment. The method 70 may be applied to the integrated circuit device 12 that is partitioned into a plurality of partitions 45. First, the host 18 may program (block 72) a first persona into the first partition 41. During this time, no persona may be currently running. Subsequently, the host 18 may determine (node 74) whether the first persona was programmed into the first partition 41. If not, the method may return to block 72.

If the host 18 determines (node 74) that the first persona was programmed into the first partition 41 (node 74), the host 18 may run (block 76) the first persona. From an outward perspective, the integrated circuit device 12 may appear to be a virtual smaller integrated circuit device running the first persona. Since the actual integrated circuit device 12 may have more resources (e.g., programmable fabric) than the virtual smaller integrated circuit device that is running on the integrated circuit device 12, the integrated circuit device 12 may use the time that the first persona is running to prepare for future partial reconfiguration switches in personas. For example, while the first persona is running, the host 18 may take advantage these additional resources to program (block 78) a second persona into the second partition 42. During this time, the first partition 41 may appear as a virtual, smaller FPGA to the user. That is, the first partition 41 may appear to be an FPGA that is a fraction of the size and possesses a fraction of the resources of the integrated circuit device 12. The host 18 may determine (node 80) whether the second persona was programmed into the second partition 42. If not, the method may return to block 78. If so, the host 18 may determine (node 82) whether the first persona has finished running. If not, the method may return to block 78.

The host 18 may also program subsequent personas into the subsequent partitions. For example, while the first persona is running, the host 18 may program a third persona into the third partition 43. In some embodiments, the host 18 may know the partial reconfiguration programming times of each persona it will be programming. For example, the host 18 may know that a fourth persona has a programming time that is significantly longer (e.g., four times longer) than programming times of the other personas. In these embodiments, the host 18 may begin programming the persona with the significantly longer programming time in the subsequent partitions prior to programming the personas with shorter programming times. For example, the host 18 may program the fourth persona that has a significantly longer programming time in the fourth partition 44 before programming the third persona that has a shorter programming time in the third partition 43.

If the host 18 determines (node 82) that the first persona has finished running, the host 18 may be able to switch from running the first persona to running (block 84) the second persona; the switch may take place faster than the time it took to program the second persona. While the second persona is running, the host 18 may program subsequent personas into the subsequent partitions. For example, while the second persona is running, the host 18 may program the third persona into the third partition 43. In some embodiments, the host 18 may program the subsequent personas into previously used partitions that are not being programmed or run. For example, while the second persona is running, the host 18 may program the third persona into the first partition 41.

The embodiment described in FIG. 5 may partition the integrated circuit device 12 such that the integrated circuit device 12 may be recognized as multiple virtual and potentially independent FPGAs. Moreover, programming subsequent personas while a persona is running may "hide" programming times of the subsequent personas, such that persona programming latency may be greatly reduced.

Figure 6:
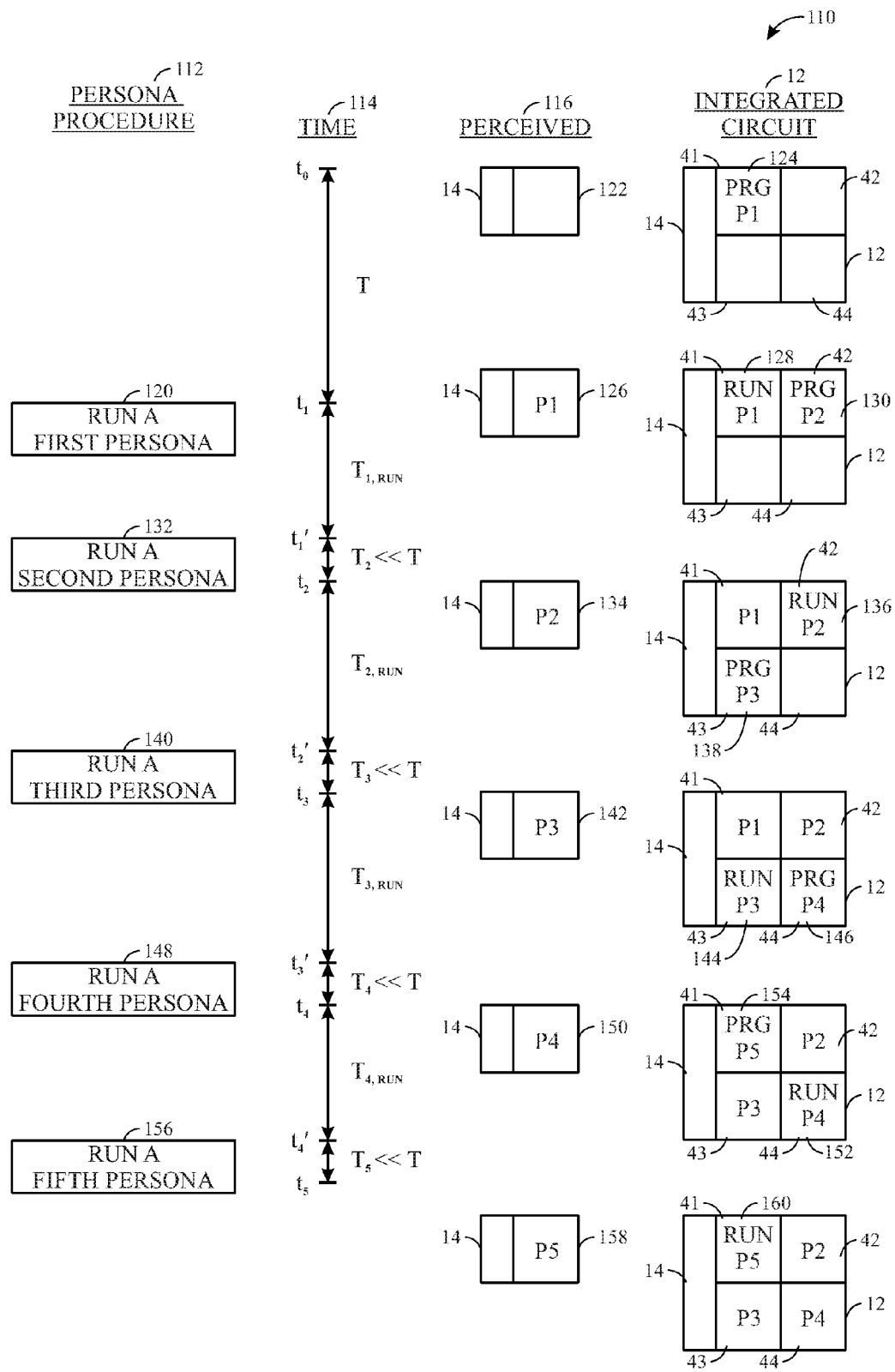
FIG. 6 is a diagram illustrating a relationship between a persona procedure, the timing of the procedure, the user's perception of an integrated circuit during the procedure, and the integrated circuit during the procedure, in accordance with an embodiment.

Turning now to FIG. 6, a diagram illustrating a relationship 110 between a persona procedure 112, the timing 114 of the procedure 112, the user's perception 116 of the integrated circuited 12 during the procedure 112, and the integrated circuit device 12 during the procedure 112, in accordance with an embodiment. The relationship 110 assumes that the integrated circuit device 12 is partitioned into the four partitions 45 as illustrated in FIG. 3 and the programming times of each persona is a time T. In some embodiments, the relationship 110 may include an integrated circuit device 12 with a different number of partitions 45 and/or personas with different programming times. Initially, the designer may seek to run (block 120) a first persona at time $t_0$. At time $t_0$, integrated circuit device 12 may appear to be inaccessible to the user because no persona is currently running while the host 18 is programming the first persona into the first partition 41. Between $t_0$ and $t_1$, for a period of time T, the host 18 may program (PRG) (item 124) the first persona (P1) into the first partition 41. As discussed above, the time to program a persona typically is on the order of seconds.

At time $t_1$, the host 18 may complete programming the first persona into the first partition 41. The host 18 may then run (item 128) the first persona for a period of time, $T_{1, Run}$, from $t_1$ to $t_{1'}$. During the time period between $t_1$ to $t_{1'}$, the first partition 41 may appear as a virtual, smaller integrated circuit device 126 to the user. Additionally, the user may perceive that the virtual, smaller integrated circuit device 126 is running the first persona. Also during the time period between $t_1$ to $t_{1'}$, while the first persona runs (item 128) on the first partition 41, the host 18 may program (item 130) the second persona (P2) into the second partition 42. The user may not perceive that the host 18 is programming (item 130) the second persona into the second partition 42, and instead may only perceive the first persona running on the virtual, smaller integrated circuit device 126 (i.e., the first partition 41).

At time $t_{1'}$, the first persona may finish running. If the second persona is programmed, then the host 18 may run (block 132) the second persona. The user may perceive a change from the first persona to the second persona over a time from $t_{1'}$ to $t_2$, for a period of time $T_2$. As discussed above, the time to program each persona may be the time T. The time to program each persona may be on the order of seconds. However, because the host 18 programmed (item 130) the second persona into the second partition 42 while the first persona ran (item 128) in the first partition 41, the programming time for the second persona may be hidden from the user. Thus, $T_2$ may represent the time to change from the first persona to the second persona, and may not include the programming time for the second persona. Instead, the user may perceive that the first persona changes to the second persona almost instantaneously (i.e., on a scale of milliseconds). Accordingly, $T_2$ may be a period of time significantly less than T (i.e., the programming time for the second persona).

The host 18 may run (item 136) the second persona for a period of time, $T_{2, Run}$, from $t_2$ to $t_{2'}$. During the time period between $t_2$ to $t_{2'}$, the second partition 42 may appear as a virtual, smaller FPGA 134 to the user. Additionally, the user may perceive that the virtual, smaller FPGA 134 is running the second persona. Also during the time period between $t_2$ to $t_{2'}$, while the second persona runs (item 136) on the second partition 42, the host 18 may program (item 138) the third persona (P3) into the third partition 43. The user may not perceive that the host 18 is programming (item 138) the third persona into the third partition 43, and instead may only perceive the second persona running on the virtual, smaller FPGA 134 (i.e., the second partition 42).

At time $t_{2'}$, the second persona may finish running. If the third persona is programmed, then the host 18 may run (block 140) the third persona. The user may perceive a change from the second persona to the third persona over a time from $t_{2'}$ to $t_3$, for a period of time $T_3$. As discussed above, the time to program each persona may be the time T. The time to program each persona may be on the order of seconds. However, because the host 18 programmed (item 138) the third persona into the third partition 43 while the second persona ran (item 136) in the second partition 42, the programming time for the third persona may be hidden from the user. Thus, $T_3$ may represent the time to change from the second persona to the third persona, and may not include the programming time for the third persona. Instead, the user may perceive that the second persona changes to the third persona almost instantaneously (i.e., on the scale of milliseconds). Accordingly, $T_3$ may be a period of time significantly less than T (i.e., the programming time for the third persona).

The host 18 may run (item 144) the third persona for a period of time, $T_{3, Run}$, from $t_3$ to $t_{3'}$. During the time period between $t_3$ to $t_{3'}$, the third partition 43 may appear as a virtual, smaller FPGA 142 to the user. Additionally, the user may perceive that the virtual, smaller FPGA 142 is running the third persona. Also during the time period between $t_3$ to $t_{3'}$, while the third persona runs (item 144) on the third partition 43, the host 18 may program (item 146) the fourth persona (P4) into the fourth partition 44. The user may not perceive that the host 18 is programming (item 146) the fourth persona into the fourth partition 44, and instead may only perceive the third persona running on the virtual, smaller FPGA 142 (i.e., the third partition 43).

At time $t_{3'}$, the third persona may finish running. If the fourth persona is programmed, then the host 18 may run (block 148) the fourth persona. The user may perceive a change from the third persona to the fourth persona over a time from $t_{3'}$ to $t_4$, for a period of time $T_4$. As discussed above, the time to program each persona may be the time T. The time to program each persona may be on the order of seconds. However, because the host 18 programmed (item 146) the fourth persona into the fourth partition 44 while the third persona ran (item 144) in the third partition 43, the programming time for the fourth persona may be hidden from the user. Thus, $T_4$ may represent the time to change from the third persona to the fourth persona, and may not include the programming time for the fourth persona. Instead, the user may perceive that the third persona changes to the fourth persona almost instantaneously (i.e., on the scale of milliseconds). Accordingly, $T_4$ may be a period of time significantly less than T (i.e., the programming time for the fourth persona).

The host 18 may run (item 152) the fourth persona for a period of time, $T_{4, Run}$, from $t_4$ to $t_{4'}$. During the time period between $t_4$ to $t_{4'}$, the fourth partition 44 may appear as a virtual, smaller FPGA 150 to the user. Additionally, the user may perceive that the virtual, smaller FPGA 150 is running the fourth persona. Also during the time period between $t_4$ to $t_{4'}$, while the fourth persona runs (item 152) on the fourth partition 44, the host 18 may program (item 154) the fifth persona into the first partition 41. As discussed above, each partition 45 may have multiple personas. The user may not perceive that the host 18 is programming (item 154) the fifth persona (P5) into the first partition 41, and instead may only perceive the fourth persona running on the virtual, smaller FPGA 150 (i.e., the fourth partition 44).

At time $t_{4'}$, the fourth persona may finish running. If the fifth persona is programmed, then the host 18 may run (block 156) the fifth persona. The user may perceive a change from the fourth persona to the fifth persona over a time from $t_{4'}$ to $t_5$, for a period of time $T_5$. As discussed above, the time to program each persona is the time T. The time to program each persona may be on the order of seconds. However, because the host 18 programmed (item 154) the fifth persona into the first partition 41 while the fourth persona ran (item 152) in the fourth partition 44, the programming time for the fifth persona may be hidden from the user. Thus, $T_5$ may represent the time to change from the fourth persona to the fifth persona, and may not include the programming time for the fifth persona. Instead, the user may perceive that the fourth persona changes to the fifth persona almost instantaneously (i.e., on the scale of milliseconds). Accordingly, $T_5$ may be a period of time significantly less than T (i.e., the programming time for the fifth persona).

While the host 18 runs (item 160) the fifth persona, the first partition 41 may appear as a virtual, smaller FPGA 158 to the user. Additionally, the user may perceive that the virtual, smaller FPGA 158 is running the fourth persona.

The embodiment described in FIG. 6 may partition the integrated circuit device 12 such that the integrated circuit device 12 may be recognized as multiple virtual and potentially independent FPGAs. Moreover, programming subsequent personas while a persona is running may "hide" programming times of the subsequent personas, such that persona programming latency may be greatly reduced.

Figure 7:
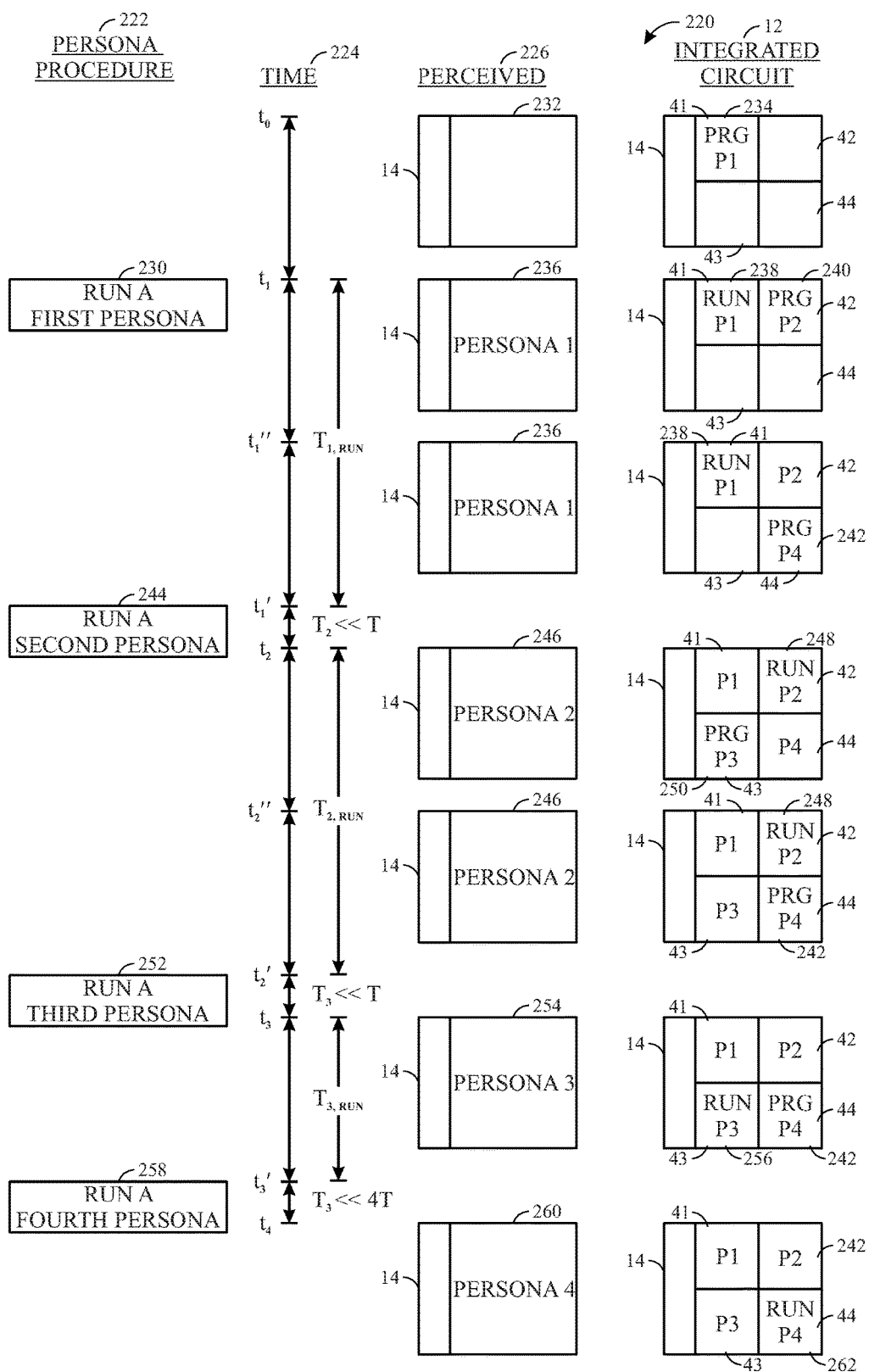
FIG. 7 is another diagram illustrating a relationship between a persona procedure, the timing of the procedure, the user's perception of an integrated circuit during the procedure, and the integrated circuit during the procedure, in accordance with an embodiment.

Turning now to FIG. 7, a diagram illustrating a relationship 220 between a persona procedure 222, the timing 224 of the procedure 222, the user's perception 226 of the integrated circuited 12 during the procedure 222, and the integrated circuit device 12 during the procedure 222, when the personas have different programming times, in accordance with an embodiment. The relationship 220 assumes that the integrated circuit device 12 is partitioned into the four partitions 45 as illustrated in FIG. 3 and the programming times of the first persona, the second persona, and the third persona are each a time T, while the programming time for the fourth persona is a time 4T. The relationship 220 may include an integrated circuit device 12 with a different number of partitions 45 and/or personas with different programming times. Initially, the designer may seek to run (block 230) the first persona at time $t_0$. At time $t_0$, the integrated circuit device 12 may appear to be inaccessible to the user because no persona is currently running while the host 18 is programming the first persona into the first partition 41. Between $t_0$ and $t_1$, for a period of time T, the host 18 may program (item 234) the first persona (P1) into the first partition 41. As discussed above, the time to program a persona typically is on the order of seconds.

At time $t_1$, the host 18 may complete programming the first persona into the first partition 41. The host 18 may then run (item 238) the first persona for a period of time, $T_{1, Run}$, from $t_1$ to $t_{1'}$. During the time period between $t_1$ to $t_{1'}$, the first partition 41 may appear as a virtual, smaller FPGA 236 to the user. Additionally, the user may perceive that the virtual, smaller FPGA 236 is running the first persona. Also during the time period between $t_1$ to $t_{1'}$, while the first persona runs (item 238) on the first partition 41, the host 18 may program (item 240) the second persona (P2) into the second partition 42. The user may not perceive that the host 18 is programming (item 240) the second persona into the second partition 42, and instead may only perceive the first persona running on the virtual, smaller FPGA 236 (i.e., the first partition 41).

At time $t_{1''}$, a time between $t_1$ and $t_{1'}$, the host 18 may finish programming (item 240) the second persona into the second partition 42 while the first persona continues running (item 238) in the first partition 41. The host 18 may then program (item 242) the fourth persona (P4) into the fourth partition 44. The host 18 programs (item 242) the fourth persona into the fourth partition 44 because the host 18 may access the program file 24 and know beforehand that the programming time of the fourth persona is significantly longer (i.e., four times longer in this example) than the programming time of the other three personas.

At time $t_{1'}$, the first persona may finish running. If the second persona is programmed, then the host 18 may run (block 244) the second persona. The user may perceive a change from the first persona to the second persona over a time from $t_{1'}$ to $t_2$, for a period of time $T_2$. As discussed above, the time to program the second persona may be the time T. The time to program each persona may be on the scale of seconds. However, because the host 18 programmed (item 240) the second persona into the second partition 42 while the first persona ran (item 238) in the first partition 41, the programming time for the second persona may be hidden from the user. Thus, $T_2$ may represent the time to change from the first persona to the second persona, and may not include the programming time for the second persona. Instead, the user may perceive that the first persona changes to the second persona almost instantaneously (i.e., on the order of milliseconds). Accordingly, $T_2$ may be a period of time significantly less than T (i.e., the programming time for the second persona).

The host 18 may run (item 248) the second persona for a period of time, $T_{2,\ Run}$, from $t_2$ to $t_{2'}$. During the time period between $t_2$ to $t_{2'}$, the second partition 42 may appear as a virtual, smaller FPGA 246 to the user. Additionally, the user may perceive that the virtual, smaller FPGA 246 is running the second persona. Also during the time period between $t_2$ to $t_{2'}$, while the second persona runs 246 on the second partition 42, the host 18 may program (item 250) the third persona (P3) into the third partition 43. The user may not perceive that the host 18 is programming (item 250) the third persona into the third partition 43, and instead may only perceive the second persona running on the virtual, smaller FPGA 246 (i.e., the second partition 42).

At time $t_{2''}$, a time between $t_2$ and $t_{2'}$, the host 18 may finish programming (item 250) the third persona into the third partition 43 while the second persona continues running (item 248) in the second partition 42. The host 18 may then determine whether the fourth persona is programmed into the fourth partition 44. If not, the host 18 may program or continue programming (item 242) the fourth persona into the fourth partition 44. The host 18 programs (item 242) the fourth persona into the fourth partition 44 because the host 18 may access the program file 24 and know beforehand that the programming time of the fourth persona is significantly longer (i.e., four times longer in this example) than the programming time of the other three personas.

At time $t_{2'}$, the second persona may finish running. If the third persona is programmed, then the host 18 may run (block 252) the third persona. The user may perceive a change from the second persona to the third persona over a time from $t_{2'}$ to $t_3$, for a period of time $T_3$. As discussed above, the time to program the third persona may be the time T. The time to program the third persona may be on the order of second. However, because the host 18 programmed (item 250) the third persona into the third partition 43 while the second persona ran (item 248) in the second partition 42, the programming time for the third persona may be hidden from the user. Thus, $T_3$ may represent the time to change from the second persona to the third persona, and may not include the programming time for the third persona. Instead, the user may perceive that the second persona changes to the third persona almost instantaneously (i.e., on the order of milliseconds). Accordingly, $T_3$ may be a period of time significantly less than T (i.e., the programming time for the third persona).

The host 18 may run (item 144) the third persona for a period of time, $T_{3,\ Run}$, from $t_3$ to $t_{3'}$. During the time period between $t_3$ to $t_{3'}$, the third partition 43 may appear as a virtual, smaller FPGA 254 to the user. Additionally, the user may perceive that the virtual, smaller FPGA 254 is running the third persona. The host 18 may determine whether the fourth persona is programmed into the fourth partition 44. If not, while the third persona runs (item 256) on the third partition 43, the host 18 may program or continue to program (item 242) the fourth persona into the fourth partition 44. The user may not perceive that the host 18 is programming (item 242) the fourth persona into the fourth partition 44, and instead may only perceive the third persona running on the virtual, smaller FPGA 254 (i.e., the third partition 43).

At time $t_{3'}$, the third persona may finish running. If the fourth persona is programmed, then the host 18 may run (block 258) the fourth persona. The user may perceive a change from the third persona to the fourth persona over a time from $t_{3'}$ to $t_4$, for a period of time $T_4$. As discussed above, the time to program the fourth persona may be the time 4T. As discussed above, the time to program a persona typically is on the order of seconds. However, because the host 18 may have programmed (item 242) the fourth persona into the fourth partition 44 while the first persona, the second persona, and the third persona ran, the programming time for the fourth persona may be hidden from the user. Thus, $T_4$ may represent the time to change from the third persona to the fourth persona, and may not include the programming time for the fourth persona. Instead, the user may perceive that the third persona changes to the fourth persona almost instantaneously (i.e., on the order of milliseconds). Accordingly, $T_4$ may be a period of time significantly less than 4T (i.e., the programming time for the fourth persona).

While the host 18 runs (item 262) the fourth persona, the fourth partition 44 may appear as a virtual, smaller FPGA 260 to the user. Additionally, the user may perceive that the virtual, smaller FPGA 260 is running the fourth persona.

The embodiment described in FIG. 7 may partition the integrated circuit device 12 such that the integrated circuit device 12 may be recognized as multiple virtual and potentially independent FPGAs. Moreover, programming subsequent personas while a persona is running may "hide" programming times of the subsequent personas, such that persona programming latency may be greatly reduced.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A device comprising:
 a programmable logic fabric comprising a plurality of partitions, wherein a first partition of the plurality of partitions is programmed with a first persona in a first programming time; and
 a controller that is configured to:
  determine whether a second programming time for programming a second persona in a second partition of the plurality of partitions is greater than a third programming time for programming a third persona in a third partition of the plurality of partitions; and
  program the second persona in the second partition while running the first persona in the first partition before programming the third persona in the third partition in response to determining that the second programming time is greater than the third programming time.

2. The device of claim 1, wherein the controller is configured to run the first persona in the first partition.

3. The device of claim 2, wherein the controller is configured to be instructed by a host to switch from running the first persona to running the second persona.

4. The device of claim 3, wherein the host is external to the device.

5. The device of claim 3, wherein the device comprises the host.

6. The device of claim 2, wherein the controller is configured to switch from running the first persona to running the second persona in a time less than the second programming time.

7. The device of claim 1, wherein the controller is configured to program the third persona in the third partition while running the first persona in the first partition before programming the second persona in the second partition in response to determining that the second programming is not greater than the third programming time.

8. The device of claim 7, wherein the controller is configured to switch from running the first persona to running the third persona in a time less than the third programming time.

9. The device of claim 1, wherein the device comprises a programmable logic device.

10. A system comprising:
a programmable logic fabric; and
a controller configured to:
  partition the programmable logic fabric into a plurality of portions;
  program a first persona in a first portion of the plurality of portions in a first programming time;
  determine a second programming time for programming a second persona in a second portion of the plurality of portions;
  determine a third programming time for programming a third persona in a third portion of the plurality of portions;
  program the second persona in the second portion before programming the third persona in the third portion in response to determining that the second programming time is greater than the third programming time; and
  program the third persona in the third portion before programming the second persona in the second portion in response to determining that the third programming time is greater than the second programming time.

11. The system of claim 10, wherein the controller is configured to run the first persona while programming the second persona in the second portion.

12. The system of claim 11, wherein the controller is configured to run the first persona while programming the third persona in the third portion after programming the second persona in the second portion.

13. The system of claim 10, wherein the controller is configured to run the first persona while programming the third persona in the third portion.

14. The system of claim 13, wherein the controller is configured to run the first persona while programming the second persona in the second portion after programming the third persona in the third portion.

15. One or more tangible, non-transitory, machine-readable-media, comprising machine readable instructions to:
  program a first persona into a first partition of an integrated circuit in a first programming time;
  cause the first persona to run in the first partition;
  determine a second programming time for programming a second persona in a second partition of the integrated circuit;
  determine a third programming time for programming a third persona in a third partition of the integrated circuit; and
  program the second persona in the second partition before programming the third persona in the third partition in response to determining that the second programming time is greater than the third programming time.

16. The one or more tangible, non-transitory, machine-readable-media of claim 15, wherein the first persona is caused to be run in a first runtime, wherein the first runtime and the second programming time overlap when the second programming time is greater than the third programming time.

17. The one or more tangible, non-transitory, machine-readable-media of claim 16, wherein the wherein the first runtime and the third programming time overlap.

18. The one or more tangible, non-transitory, machine-readable-media of claim 15, comprising machine readable instructions to program the third persona in the third partition before programming the second persona in the second partition in response to determining that the third programming time is greater than the second programming time.

19. The one or more tangible, non-transitory, machine-readable-media of claim 18, wherein the first persona is run in a first runtime, wherein the first runtime and the third programming time overlap when the third programming time is greater than the second programming time.

20. The one or more tangible, non-transitory, machine-readable-media of claim 19, wherein the wherein the first runtime and the second programming time overlap.

* * * * *